United States Patent
Sampath et al.

(10) Patent No.: US 9,264,289 B2
(45) Date of Patent: Feb. 16, 2016

(54) ENDPOINT DATA CENTERS OF DIFFERENT TENANCY SETS

(71) Applicant: Microsoft Corporation, Redmond, WA (US)

(72) Inventors: Sriram Sampath, Redmond, WA (US); Tristan William Scott, Issaquah, WA (US); Ido Miles Ben-Shachar, Kirkland, WA (US); Ersev Samim Erdogan, Seattle, WA (US); Niraj Agarwala, Bothell, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 298 days.

(21) Appl. No.: 13/929,456

(22) Filed: Jun. 27, 2013

(65) Prior Publication Data

US 2015/0006609 A1 Jan. 1, 2015

(51) Int. Cl.
*H04L 29/08* (2006.01)
*G06F 9/50* (2006.01)

(52) U.S. Cl.
CPC .......... *H04L 29/0872* (2013.01); *G06F 9/5027* (2013.01); *G06F 9/5072* (2013.01)

(58) Field of Classification Search
USPC ....................................... 709/202
See application file for complete search history.

(56) References Cited

U.S. PATENT DOCUMENTS

| 7,940,756 | B1* | 5/2011 | Duffy et al. | 370/389 |
| 8,285,862 | B2* | 10/2012 | Pace et al. | 709/228 |
| 2006/0239295 | A1 | 10/2006 | Rao et al. | |
| 2008/0010375 | A1 | 1/2008 | Coleman et al. | |
| 2011/0145392 | A1 | 6/2011 | Dawson et al. | |

(Continued)

FOREIGN PATENT DOCUMENTS

WO 2009/026096 A2 2/2009

OTHER PUBLICATIONS

"International Search Report & Written Opinion for PCT Patent Application No. PCT/US2014/044157", Mailed Date: Oct. 7, 2014, 9 Pages.

(Continued)

*Primary Examiner* — Tu Nguyen
(74) *Attorney, Agent, or Firm* — Kate Drakos; Doug Barker; Micky Minhas (57) ABSTRACT

An endpoint broker to provide application launch endpoints from multiple data centers having different tenancy sets. Upon accessing a request for an application launch endpoint connection for a user, the broker selects a data center, from amongst multiple data centers that have different tenancy sets, that is to provide an endpoint in satisfaction of the request. The endpoint broker identifies an endpoint from the selected data center, and then associates the identified endpoint with the user. The user is then provided access to the identified endpoint using the association. Thus, a user is not restricted to having an endpoint from a single data center. If there are concerns with providing an endpoint from one data center, an endpoint may be provided from another data center in a manner that is transparent to the user.

20 Claims, 4 Drawing Sheets

(56) References Cited

U.S. PATENT DOCUMENTS

| | | | |
|---|---|---|---|
| 2011/0179132 A1 | 7/2011 | Mayo et al. | |
| 2012/0011077 A1 | 1/2012 | Bhagat | |
| 2012/0016932 A1* | 1/2012 | De Castro et al. | 709/203 |
| 2012/0042216 A1 | 2/2012 | Blubaugh | |
| 2012/0131664 A1 | 5/2012 | Gerber et al. | |
| 2012/0204187 A1 | 8/2012 | Breiter et al. | |
| 2012/0281708 A1 | 11/2012 | Chauhan et al. | |
| 2012/0297016 A1 | 11/2012 | Iyer et al. | |
| 2013/0039360 A1 | 2/2013 | Manian et al. | |
| 2013/0073703 A1 | 3/2013 | Das et al. | |

OTHER PUBLICATIONS

"Windows Azure and the Private Cloud", Published on: Sep. 17, 2012, Available at: http://msdn.microsoft.com/en-us/library/windowsazure/jj136831.aspx.

"Second Written Opinion Issued in PCT Patent Application No. PCT/US2014/044157", Mailed Date: Jul. 13, 2015, 5 Pages.

"International Preliminary Report on Patentability Issued in PCT Patent Application No. PCT/US2014/044157", Mailed Date: Oct. 1, 2015, 6 Pages.

* cited by examiner

ENDPOINT DATA CENTERS OF DIFFERENT TENANCY SETS

BACKGROUND

Desktops are platforms that may be used to launch other applications. In remote desktop environments, the desktop platform is provided at a remote location as compared to the client machine that is viewing the desktop. In this context, the remote desktop platform may be considered an application launch endpoint as the client connects to this endpoint in order to obtain the application launch capabilities provided by the desktop platform.

An example of an application launch endpoint is a virtual machine. A virtual machine runs the desktop logic remotely, but provides rendering instructions to the local client machine. The user may interact with the client machine to launch applications that will run in the context of the virtual machine. Another example of an application launch endpoint is a session managed by session management servers (also called a terminal server).

Conventionally, application launch endpoints are deployed in the "private cloud" meaning that the data center that supports the application launch endpoint is managed and maintained within an enterprise corresponding to the users the endpoints serve. More recently, application launch endpoints have been deployed in the "public cloud" in data centers that support multiple tenants, and that may perhaps be remotely located from the tenants that the data center(s) support.

BRIEF SUMMARY

At least some embodiments described herein relate to the use of an endpoint broker to provide application launch endpoints from multiple data centers having different tenancy sets. Upon accessing a request for an application launch endpoint connection for a user, the broker selects a data center, from amongst multiple data centers, that is to provide an endpoint in satisfaction of the request. The multiple data centers may include data centers that have different tenancy sets. As an example only, the data centers might include an enterprise data center that represents a private cloud that serves only entities within the enterprise, thus having a single tenant. The data centers might include a public data center that represents a public cloud that serves any of a wide variety of potential tenants that can connect over a network to the public data center, thus representing even potentially a large number of tenants. The data centers might also include a hoster data center, which serves multiple tenants, but is more restricted than a public data center in terms of the size and the number of tenants that are served.

The endpoint broker identifies an endpoint from the selected data center, and then associates the identified endpoint with the user. The user is then provided access to the identified endpoint using the association. Thus, a user is not restricted to having an endpoint from a single data center. If there are concerns with providing an endpoint from one data center, an endpoint may be provided from another data center in a manner that is transparent to the user. This allows enterprises to have more flexible policy regarding where the endpoints are going to be provided from. For instance, if a private cloud is too busy to provide an endpoint, a public cloud or a hoster might provide the endpoint instead.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the use of an endpoint broker to provide application launch endpoints from multiple data centers having different tenancy sets. The use of multiple data centers from different tenancy sets allows any given tenant to have more flexible access to an application launch endpoint regardless of where the endpoint is provided from. Policy may be set up to determine from which data center an endpoint is to be provided to satisfy any given connection request.

Upon accessing a request for an application launch endpoint connection for a user, the broker selects a data center, from amongst multiple data centers, that is to provide an endpoint in satisfaction of the request. The multiple data centers may include data centers that have different tenancy sets. As an example only, the data centers might include an enterprise data center that represents a private cloud that serves only entities within the enterprise, thus having a single tenant. The data centers might include a public data center that represents a public cloud that serves any of a wide variety of potential tenants that can connect over a network to the public data center, thus representing even potentially a large number of tenants. The data centers might also include a hoster data center, which serves multiple tenants, but is more restricted than a public data center in terms of the size and the number of tenants that are served.

The endpoint broker identifies an endpoint from the selected data center. To do this, the endpoint broker might communicate with whichever data center has been selected to provide the endpoint. The endpoint broker then associates the identified endpoint with the user. The user is then provided access to the identified endpoint using the association. For instance, future communications from that user may be provided by the endpoint broker to the associated endpoint. Thus, a user is not restricted to having an endpoint from a single data center. If there are concerns with providing an endpoint from one data center, an endpoint may be provided from another data center in a manner that is transparent to the user. This allows enterprises to have more flexible policy regarding where the endpoints are going to be provided from. For instance, if a private cloud is too busy to provide an endpoint, a public cloud or a hoster might provide the endpoint instead. This also helps the customer with the benefits of a scalable and elastic cloud. They do not need to pre-provision for maximum capacity in their private cloud data center; and can depend on the public cloud for peak hour needs.

Some introductory discussion of a computing system will be described with respect to FIG. 1. Then, the use a multiple data centers of different tenancy sets to provide endpoints will be described with respect to FIGS. 2 through 4.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
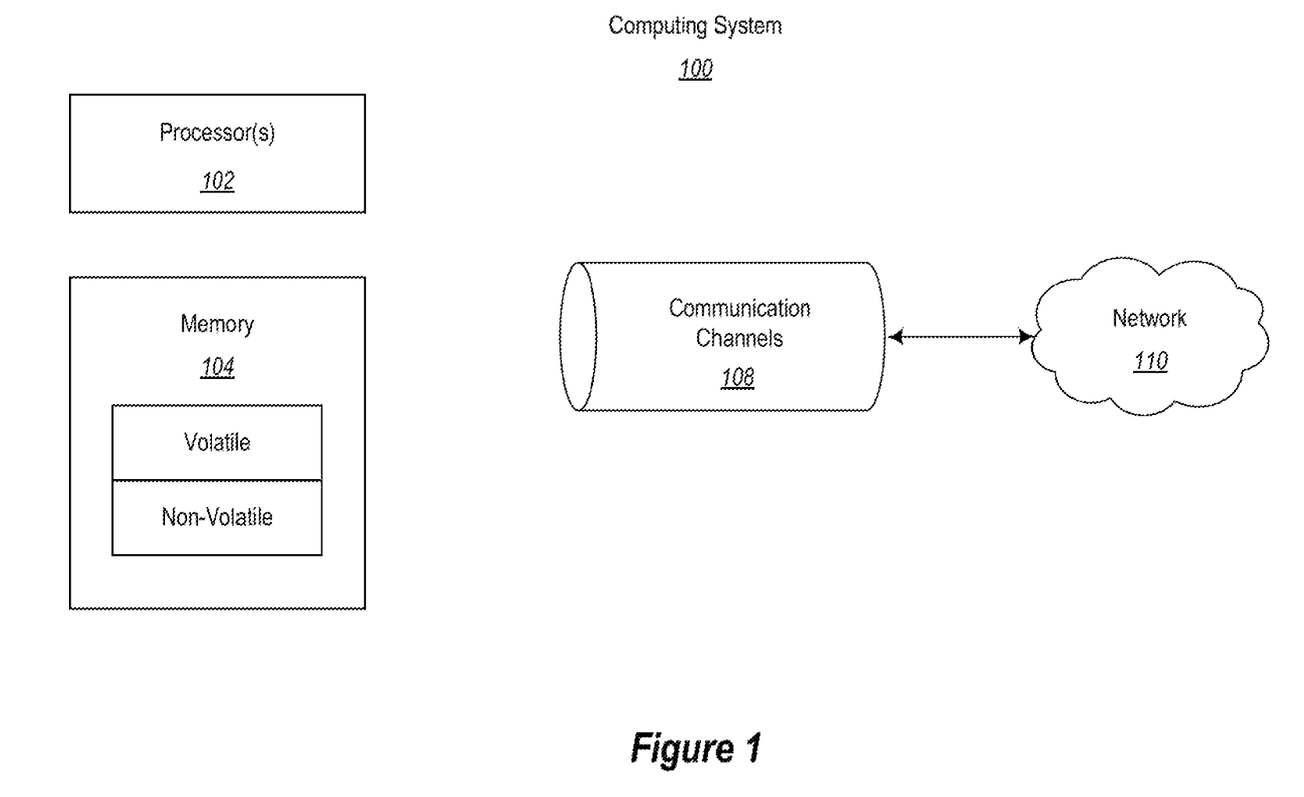
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
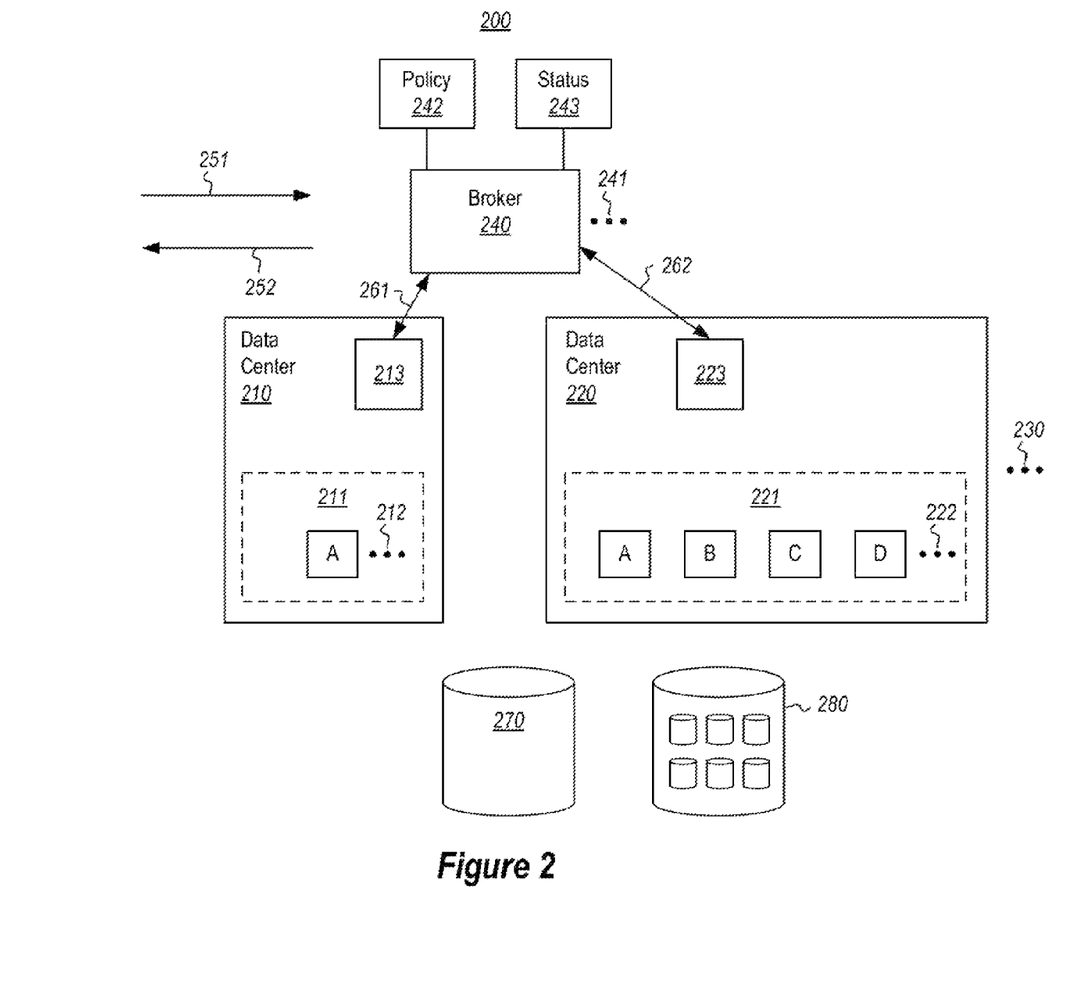
FIG. 2 illustrates a network environment in which the principles described herein may be employed including at least two data centers, each having different tenancy sets.

FIG. 2 illustrates a network environment 200 in which the principles described herein may be employed. The environment 200 includes at least two data centers 210 and 220, although the ellipses 230 represents that there may be other numbers of data centers also, including as few as two (in which case there would be only data centers 210 and 220) to more than the three data centers illustrated.

Each data center serves a different tenant set, but having at least one tenant in common. For instance, data center 210 is associated with a corresponding tenant set 211, and data center 220 has a corresponding tenant set 221. Each tenant set includes one or more tenants that the corresponding data center is configured to serve. In this description and in the claims, a "tenant" is defined as any collection of one or more users in which the associated data of the collection of users is kept isolated from other tenants. In the case of a private cloud, a private data center or on-premises data center is established by an enterprise for the sole purpose of serving users of the enterprise. Isolation is guaranteed by the physical presence of the data on-premises, and protections guarding against external access. In the case of a public cloud, a public data center may be accessed by customers over a network. In the case of a public data center, a tenant typically corresponds to a customer, which can be a larger collection of users in the case of an enterprise, or might even be as small as a single user. The public cloud includes isolation protections that guard against intermingling tenant data across tenants. In the case of a hoster, the corresponding hoster data center is typically smaller than a public data center and serves a fewer number of tenants than a public data center.

For instance, tenant set 211 of data center 210 includes tenant A, symbolically representing that the data center 210 serves users of tenant A. For instance, the data center 210 might be a private data center. Tenant set 221 of data center 220 includes tenants A, B, C and D, symbolically representing that the data center 220 serves users of tenants A, B, C and D, keeping the respective tenant data isolated from other tenants. For instance, the data center 220 might be a public data center, or perhaps a hoster data center.

At least one of the tenants in the tenant set 211 of the first data center 210 is common with a tenant in the tenant set 221 of the second data center 220. For instance, tenant A is in the tenant set 211 as well as in the data center 221. For instance, the data center 210 might be the private data center of tenant A, whereas the tenant A is also a customer of the data center 220.

The tenant set 211 of the first data center 211 is illustrated as including ellipses 212 symbolically representing that the first data center 210 might serve more than one tenant in some examples. Also, the tenant set 221 of the second data center 221 is illustrated as including ellipses 222 symbolically representing that the second data center 220 might serve other numbers of tenants. However, the processing power of the first data center 210 is less than that of the second data center 220, which typically means that the first tenant set 211 has fewer tenants than the second tenant set 221. As an example, the first data center 210 might be a private data center of tenant A, whereas the second data center 220 might be a hoster data center that serves a number of tenants including tenant A. As another example, the first data center 210 might be a hoster data center of tenant A, whereas the second data center 220 might be a public data center that serves many tenants including tenant A.

The environment 200 also includes an endpoint broker 240. The endpoint broker 240 may be operated within the first data center 210, within the second data center 220, within another data center 230, or outside of any data center. The endpoint broker may be implemented using hardware, software, or a combination of hardware and software. The endpoint broker may be instantiated and/or operated (as described herein) in response to one or more processors (such as processors 102) of a computing system (such as computing system 100) executing one or more computer-executable instructions that are embodied on one or more computer-readable media. Such one or more computer-readable media may form all or part of a computer program product.

Figure 3:
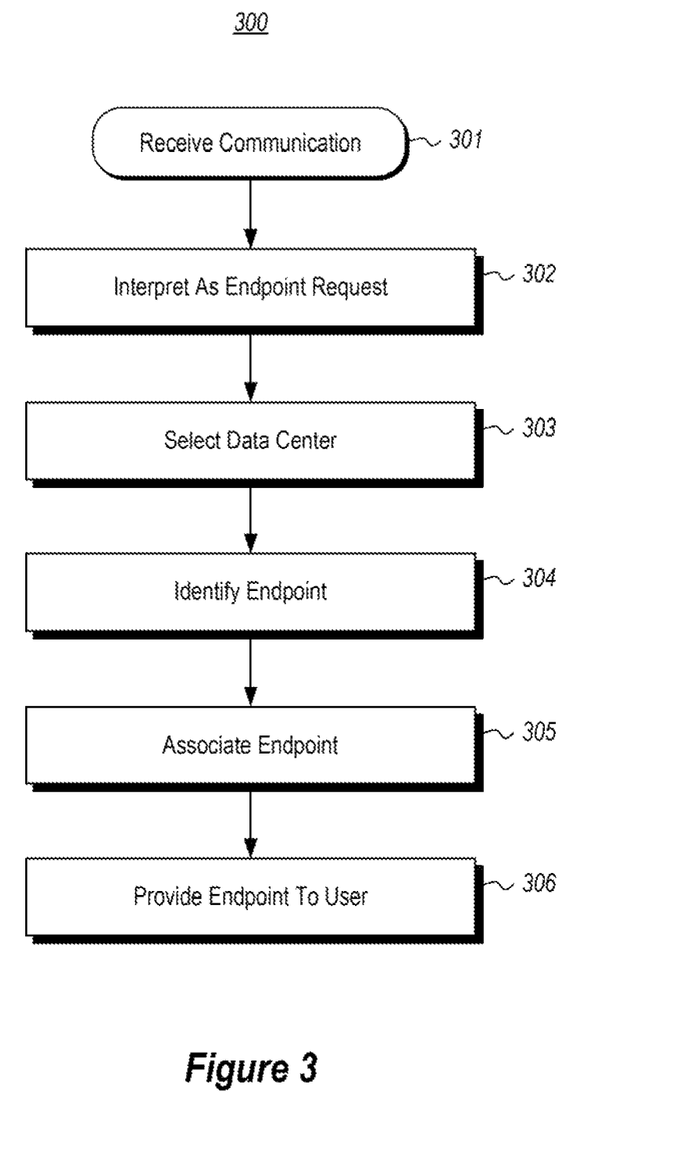
FIG. 3 illustrates a flowchart of a method for providing application launch endpoints from multiple data centers having different tenancy sets.

FIG. 3 illustrates a flowchart of a method 300 for providing application launch endpoints from multiple data centers having different tenancy sets. The method 300 is initiated upon receiving a communication (event 301). The method 300 may be performed by the endpoint 240 of FIG. 2, and thus the method 300 will hereinafter be described with frequent reference to both FIGS. 2 and 3.

As previously mentioned, the method 300 is initiated upon receiving a communication (event 301). This is represented in FIG. 2 by the endpoint broker 240 receiving the communication 251. The endpoint broker then interprets the communication as being an application launch endpoint connection request for a user (act 302) that belongs to a tenant of both the data center 210 and the data center 220. For instance, the user may belong to the collection of one or more users of the tenant A.

The request is thus for the endpoint broker to provide an endpoint for a user of tenant A, that the user can use to launch one or more applications for the user. An example of an endpoint is a virtual machine or a session of a terminal server. In this manner, the endpoint broker 240 accesses an application launch endpoint connection request for a user. The request might specify one or more parameters that may be used to provide the endpoint including, for example, an application identifier, a type of endpoint (e.g., virtual machine or session of a terminal server), or hardware configurations of the endpoint (such as how much disk space or memory is desired).

The endpoint broker then selects a data center, from amongst multiple data centers, to provide the endpoint in satisfaction of the application launch endpoint connection request (act 303). For instance, in FIG. 2, the endpoint broker may select the first data center 210 or the second data center 220 to provide the endpoint for the user. The decision on which to use may be performed in response to policy 242 as well as a current status 243. Since the user is that of tenant A, the endpoint broker may select from two data centers 210 and 220. If the user were of another tenant, other options for possible data centers might be available.

The policy 242 might specify that, for tenant A, if the status 243 of the first data center 210 is less than a certain percentage of utilization, then the first data center 210 is to be used to provide the endpoint for the user, and otherwise the second data center 220 may be used to provide the endpoint for the user. Thus, in the case in which the data center 210 is a private data center, the tenant A might set up the private data center. Rather than fully scaling up the private data center to handle peak loads for endpoints. The tenant A may instead contract with the provider of the data center 220 (e.g., a hoster or a public cloud provider), to handle overflow. Other policy might be used as well. For instance, perhaps the user has already some state associated with an endpoint in a particular data center that the user wants to continue using. In that case, the data center with the state may be used to provide the endpoint.

The endpoint broker 240 then identifies an endpoint from the selected data center that is to be associated with the user (act 304). In order to do so, the endpoint broker 240 may communicate with an endpoint assignment agent in the selected data center. For instance, if the endpoint broker 240 selects the first data center 210, the endpoint broker 240 may communicate with the endpoint assignment agent 213 in the first data center 210 as represented by arrow 261. If the endpoint broker 240 selects the second data center 220, the endpoint broker 240 may communicate with the endpoint assignment agent 223 in the second data center 220 as represented by arrow 262. If the endpoint broker 240 operates within a data center, then perhaps the endpoint broker 240 may also act as the endpoint assignment agent for that data center.

The endpoint assignment agent then selects an endpoint for the user. The parameters chosen for the endpoint may be selected in response to the parameters specified in the original request and/or in response to the policy 242. The endpoint broker then identifies the endpoint (act 305) that is to be associated with the user, and then associates the identified endpoint with the user (act 306). For instance, the endpoint broker may provide routing instructions to the requester so that the user can later use their client machine to route further endpoint instructions to the endpoint directly. For instance, such an endpoint routing instruction might include the Internet Protocol (IP address of the endpoint).

In some embodiments, though perhaps remotely located from each other, the first data center 210 and the second data center 220 as well as potentially the other one or more data centers 230 are coupled with each other in a common addressable network such as over a virtual private network (VPN). Thus, the IP address provided to the user will work regardless of whether the endpoint is provided by the first data center 210, the second data center 220, or some other data center 230. This may also allow for configuration information regarding the assigned endpoint to be accessible over the larger network to all data centers. For instance, a common store 270 may be used and made accessible over the network to each of the data centers.

The endpoint broker then provides the user with access to the identified endpoint (act 306). This is represented in FIG. 2 with arrow 252. As part of this association, the user might also associate a user's virtual hard drive with the endpoint. For instance, the network environment 200 includes a set of user virtual hard drives 280. The user virtual hard drive for the selected user may be associated so as to be available to the endpoint and any application launched by that endpoint. In one approach to associate the user virtual hard drive, the user virtual hard drive could "roam" with the user to the endpoint where the user is logged on. For example, the user virtual hard drive could be copied from the private cloud to the public cloud if the user logs on to a private cloud endpoint first and then to a public cloud endpoint. In a second approach, the user virtual hard drive could be automatically replicated by the system across multiple datacenters in frequent intervals (perhaps every minute), so wherever the user ultimately ends up logging on, the user will get his/her latest documents.

The ellipses 241 are provided in FIG. 2 to represent that there may be multiple instance of the endpoint broker running. For instance, there may be one or more instances of the endpoint broker running in the first data center 210 as well as one or more instances of the endpoint broker running in the second data center 220. A load balancer may be placed upstream to receive all endpoint connection requests from any user, and distribute them in accordance with some policy to a selected endpoint broker.

Figure 4:
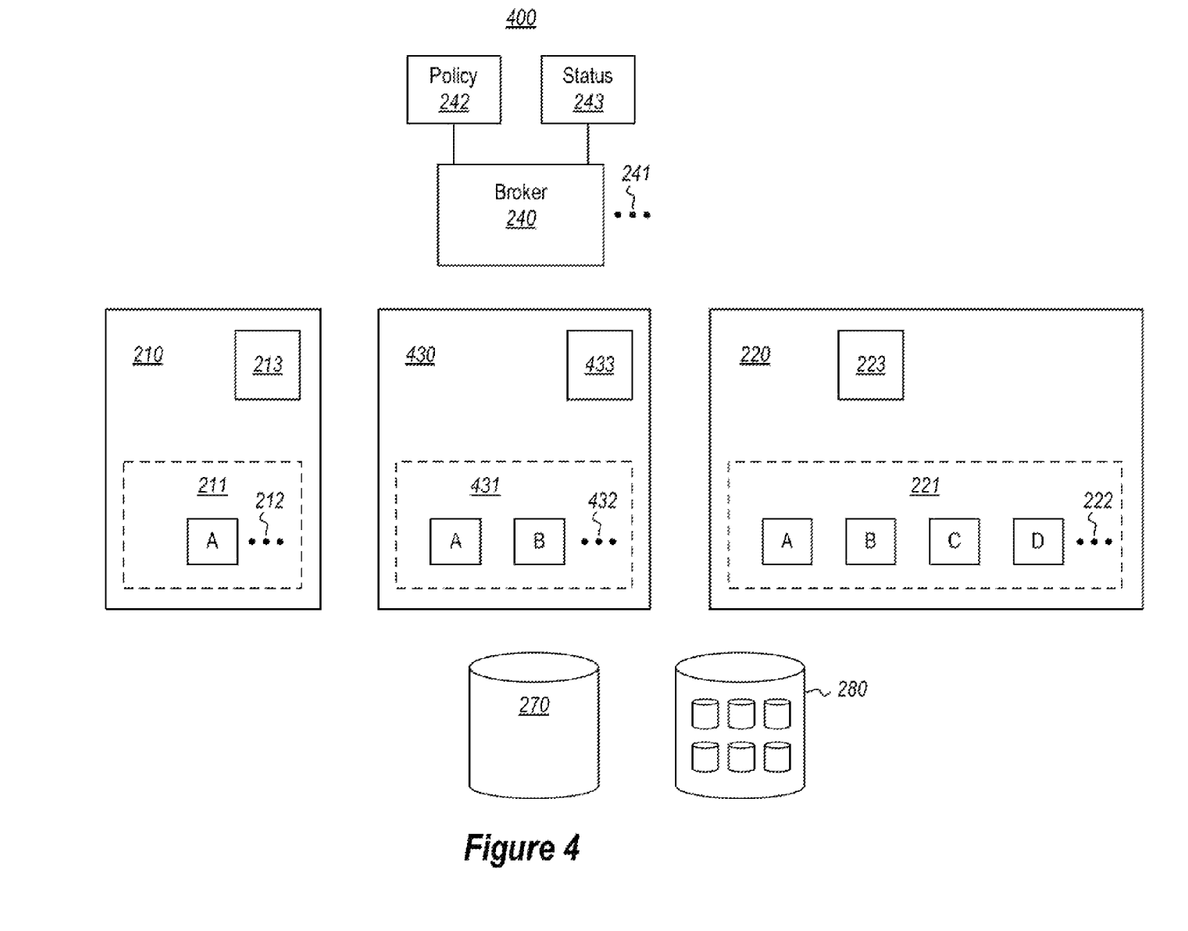
FIG. 4 illustrates a network environment representing an embodiment of FIG. 2, but in which there are three data centers having different tenancy sets illustrated.

FIG. 4 illustrates a network environment 400 that is similar to the network environment 200 of FIG. 2 except that now a third data center 430 is illustrated. The third data center 430 is of a scale that is between the first data center 210 and the second data center 220. For instance, the tenant set 431 of the third data center 430 includes just two tenants A and B (amongst other as represented by the ellipses 432). Thus, when the endpoint broker 240 receives connection requests associated with the tenant A, the broker 240 may choose amongst three endpoint brokers to provide the endpoint for the user. As an example, in FIG. 4, the data center 210 might be a private data center, the data center 430 might be a hoster, and the data center 220 might be a public data center.

Note also that the principles described herein may be hierarchically structured. For instance, in FIG. 2, the data center 220 may likewise be a network environment that includes multiple data centers. In that case, the initiation of communication (as represented by arrow 262) may be treated by the endpoint assignment agent 223 as the same as a request for an endpoint (event 301), thereby triggering the agent 223 to act as described for the endpoint broker 240 in causing one of its constituent data centers to generate an endpoint for the user.

Accordingly, the principles described herein provide for a hybrid cloud deployment of endpoints, thereby allowing for more flexible design for the providing of the users of a tenant with endpoint that may be used to launch applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-readable storage media having thereon computer-executable instructions that are structured such that, when executed by one or more processors of a computing system, the computing system is caused to perform a computer-implemented method comprising acts of:
at an endpoint broker, receiving from a user computing system at a given tenant a request for an application launch endpoint connection, wherein the endpoint broker provides endpoint connections to at least a first data center with a first set of tenants, and a second data center with a second set of tenants, and wherein the given tenant belongs to both the first set of tenants and to the second set of tenants;
in response to a stored policy which defines conditions as to whether the first data center or the second data center is to be accessed, the endpoint broker selecting one of the first and second data centers in order to satisfy the application launch endpoint connection request so that the user computing system at the given tenant is not restricted to having an endpoint connection to only a single data center;
based on one or more parameters specified in the request, the endpoint broker identifying an endpoint to be associated with the user computing system at the given tenant, and accessing an endpoint assignment for the identified endpoint at the selected one of the first and second data centers;
returning the endpoint assignment for the identified endpoint to the user computing system of the given tenant; and
associating the user computing system of the given tenant with the identified endpoint of the selected one of the first and second data centers.

2. The computer-readable storage media in accordance with claim 1, wherein the endpoint broker selecting one of the first and second data centers is also based on taking into account a current status of at least one of the first and the second data centers.

3. The computer-readable storage media in accordance with claim 1, wherein the endpoint broker identifying an endpoint to be associated with the user computing system at the given tenant is performed by accessing an endpoint assignment agent at the selected one of the first and second data centers.

4. The computer-readable storage media in accordance with claim 1, wherein the one or more parameters specified in the request comprises at least one of an application identifier, an endpoint type, and a hardware configuration.

5. The computer-readable storage media in accordance with claim 1, wherein the first data center is a private data center and wherein the second data center is either a public data center or hoster data center.

6. A computer-implemented method for providing application launch endpoints from multiple data centers having different tenancy sets, the computer-implemented method being performed by one or more processors executing computer executable instructions for the computer-implemented method, and the computer-implemented method comprising:
at an endpoint broker, receiving from a user computing system at a given tenant a request for an application launch endpoint connection, wherein the endpoint broker provides endpoint connections to at least a first data center with a first set of tenants, and a second data center with a second set of tenants, and wherein the given tenant belongs to both the first set of tenants and to the second set of tenants;
in response to a stored policy which defines conditions as to whether the first data center or the second data center is to be accessed, the endpoint broker selecting one of the first and second data centers in order to satisfy the application launch endpoint connection request so that the user computing system at the given tenant is not restricted to having an endpoint connection to only a single data center;
based on one or more parameters specified in the request, the endpoint broker identifying an endpoint to be associated with the user computing system at the given tenant, and accessing an endpoint assignment for the identified endpoint at the selected one of the first and second data centers;
returning the endpoint assignment for the identified endpoint to the user computing system of the given tenant; and
associating the user computing system of the given tenant with the identified endpoint of the selected one of the first and second data centers.

7. The computer-implemented method in accordance with claim 6, wherein the endpoint broker selecting one of the first and second data centers is also based on taking into account a current status of at least one of the first and the second data centers.

8. The computer-implemented method in accordance with claim 7, wherein the endpoint broker identifying an endpoint to be associated with the user computing system at the given tenant is performed by accessing an endpoint assignment agent at the selected one of the first and second data centers.

9. The computer-implemented method in accordance with claim 7, wherein the one or more parameters specified in the request comprises at least one of an application identifier, an endpoint type, and a hardware configuration.

10. A system comprising:
at least a first data center with a first set of tenants, and a second data center with a second set of tenants;
a user computing system at a given tenant wherein the given tenant belongs to both the first set of tenants and to the second set of tenants;
a memory containing executable instructions for a computer-implemented method that provides application launch endpoints from the first and second data centers so that the user computing system at the given tenant is not restricted to having an endpoint connection to only a single data center;
one or more processors which, when executing the executable instructions, configure an endpoint broker to perform the computer-implemented method, by performing the following acts:
receives from the user computing system at the given tenant a request for an application launch endpoint connection, wherein the endpoint broker provides endpoint connections to at least the first data center and the second data center;
in response to a stored policy which defines conditions as to whether the first data center or the second data center is to be accessed, the endpoint broker selects one of the first and second data centers in order to satisfy the application launch endpoint connection request so that the user computing system at the given tenant is not restricted to having an endpoint connection to only a single data center;
based on one or more parameters specified in the request, the endpoint broker identifies an endpoint to be associated with the user computing system at the given tenant, and accesses an endpoint assignment for the identified endpoint at the selected one of the first and second data centers; and
returns the endpoint assignment for the identified endpoint to the user computing system of the given tenant to facilitate associating the user computing system of the given tenant with the identified endpoint of the selected one of the first and second data centers.

11. The system in accordance with claim 10, wherein the endpoint broker is operating within one of the first and second data centers.

12. The system in accordance with claim 11, wherein there are one or more other endpoint brokers with at least one endpoint broker operating within each of the first and second data centers.

13. The system in accordance with claim 10, wherein the first data center is a private data center and the second data center is a public data center.

14. The system in accordance with claim 13, wherein the endpoint broker provides an endpoint connection to a third data center this is a hoster data center that has a third set of tenants, and wherein the given tenant is common to the first, second and third sets of tenants.

15. The system in accordance with claim 14, wherein the endpoint broker does not operate within either the first or second data center.

16. The system in accordance with claim 10, wherein the identified endpoint is either a virtual machine or a session of a terminal server.

17. The system in accordance with claim 10, wherein the first data center and the second data center are coupled with each other in a common addressable network.

18. The system in accordance with claim 10, wherein the endpoint broker selects one of the first and second data centers also based on taking into account a current status of at least one of the first and the second data centers.

19. The system in accordance with claim 10, wherein the endpoint broker identifies an endpoint to be associated with the user computing system at the given tenant by accessing an endpoint assignment agent at the selected one of the first and second data centers.

20. The system in accordance with claim 10, wherein the one or more parameters specified in the request comprises at least one of an application identifier, an endpoint type, and a hardware configuration.

* * * * *